United States Patent

Gebauer et al.

Patent Number: 5,741,040
Date of Patent: *Apr. 21, 1998

[54] RECIPROCATING MECHANISM

[75] Inventors: Paul Gebauer, St. Clair Shores; Jay R. White, Bloomfield Hills, both of Mich.

[73] Assignee: Jay Roberts Company, Troy, Mich.

[*] Notice: The term of this patent shall not extend beyond the expiration date of Pat. No. 5,498,053.

[21] Appl. No.: 531,632

[22] Filed: Sep. 21, 1995

Related U.S. Application Data

[63] Continuation-in-part of Ser. No. 217,983, Mar. 25, 1994, Pat. No. 5,498,053.
[51] Int. Cl.$^6$ .................................................. B60J 3/00
[52] U.S. Cl. .................. 296/97.2; 296/97.4; 74/31; 41/32; 41/362; 312/319.8; 476/15; 476/65
[58] Field of Search .................. 296/97.5, 97.4, 296/97.2; 49/32, 362; 312/319.5, 319.8; 74/31; 476/15, 64, 65

[56] References Cited

U.S. PATENT DOCUMENTS

| | | | |
|---|---|---|---|
| 1,698,130 | 1/1929 | Graves | 74/31 |
| 5,438,491 | 8/1995 | White | 362/83.1 |
| 5,475,573 | 12/1995 | White | 296/97.5 X |
| 5,498,053 | 3/1996 | Gebauer et al. | 296/97.5 |

Primary Examiner—Dennis H. Pedder
Attorney, Agent, or Firm—Gifford, Krass, Groh, Sprinkle, Patmore, Anderson & Citkowski, P.C.

[57] ABSTRACT

A mechanism is provided to reciprocate an element with a motor rotating in one direction to produce forward and reverse motion by a drive wheel in contact with the obverse and reverse faces of the element. The element can take various forms such as a sliding door covering a vanity mirror in a vehicular sun visor, a sliding drawer or a pivoting door.

18 Claims, 3 Drawing Sheets

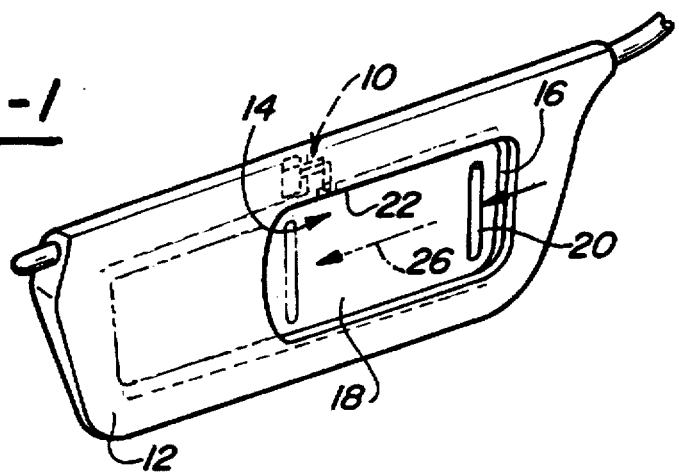
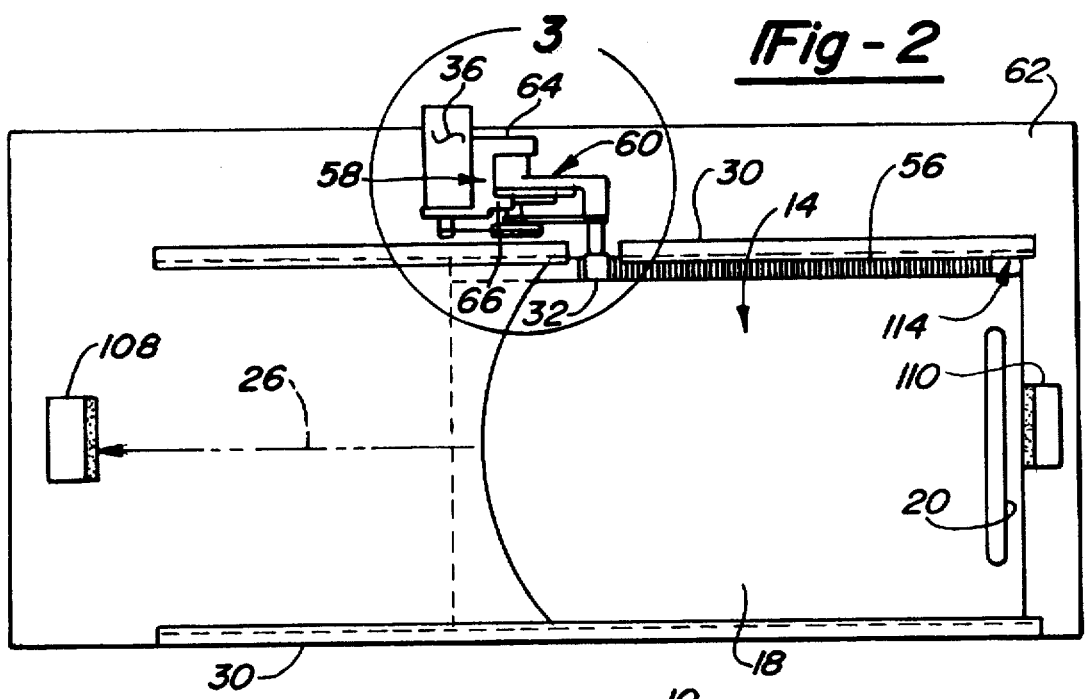
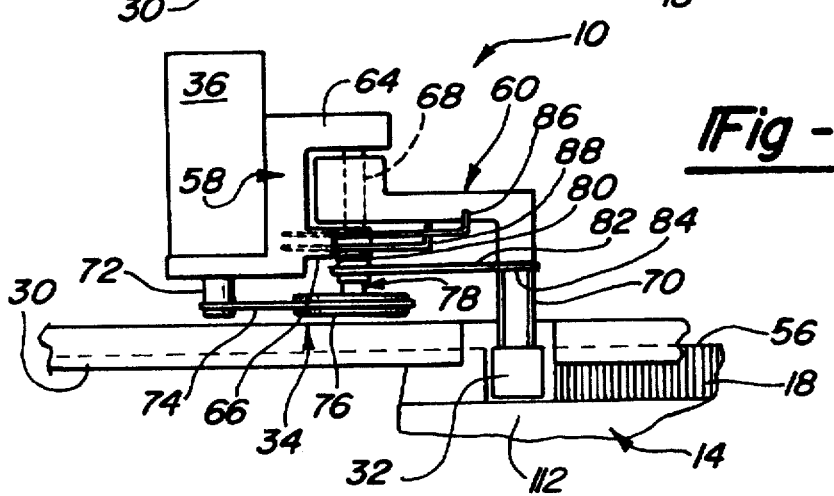

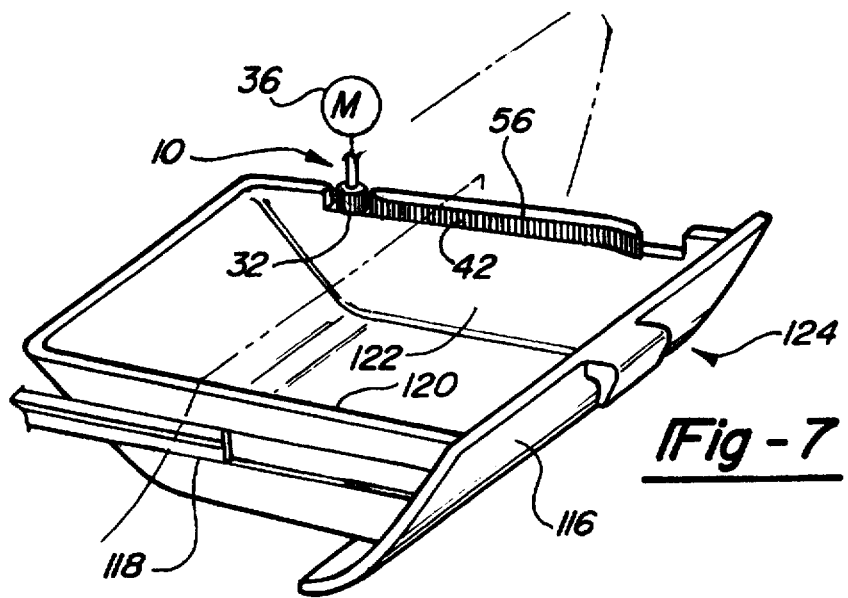
Fig-7
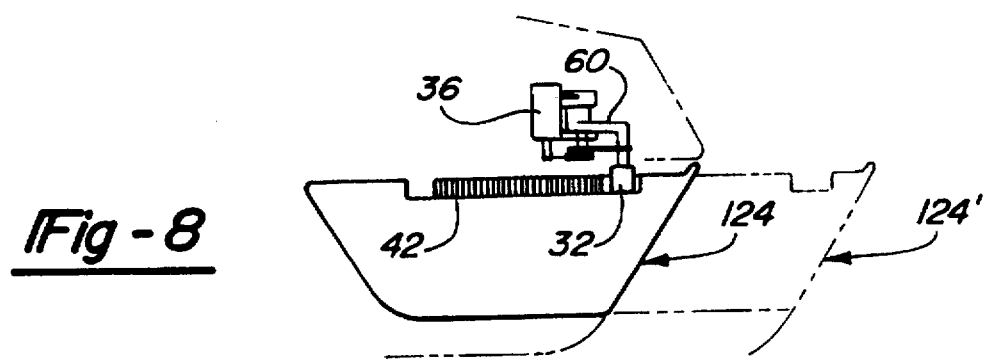
Fig-8
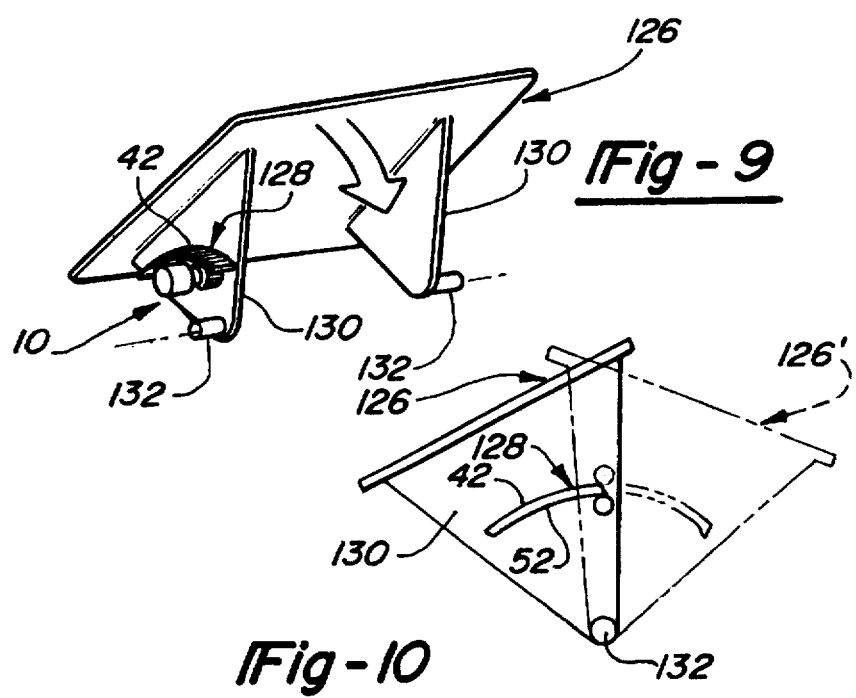
Fig-9
Fig-10

RECIPROCATING MECHANISM

CROSS REFERENCE TO RELATED APPLICATION

This patent application is a continuation-in-part of our patent application Ser. No. 08/217,983 filed Mar. 25, 1994 now U.S. Pat. No. 5,498,053.

BACKGROUND OF THE INVENTION

1. Field of the Invention

This invention relates to a reciprocating mechanism. More particularly, this invention relates to a mechanism which includes a rotary motor which is used to reciprocate elements of various configurations such as plate-like items including doors and covers along linear paths and other multi-shaped items such as drawers, platens, conveyors and the like along linear, curvilinear, swinging and compound paths.

2. State of the Art

As mentioned in our above referred to parent application, there are a wide variety of mechanisms used to reciprocate all types of objects. This invention is concerned with producing reciprocation by the use of a rotary motor that is run in only one direction, and, as in the parent application, the element is shown as a reciprocating thin plate-like element which serves as a sliding door to cover and expose a vanity mirror in a vehicular sun visor.

SUMMARY OF THE INVENTION

A reciprocating mechanism of the invention includes a motor, a drive wheel which is rotated by the motor and an element having an obverse or principal face and a reverse face along a longitudinally extending side. A resilient member biasingly maintains the drive wheel in resilient contact with the obverse face for moving the element in a forward direction. The resilient member also maintains the drive wheel in resilient contact with the reverse face for moving the element in a backward direction.

In a preferred form of the invention, a starting ramp is located on both the obverse and the reverse faces of the element at opposite ends of the longitudinally extending side, and a switch is arranged to activate the motor when the element is moved with the drive wheel in contact with one of the starting ramps. A resilient member not only maintains the drive wheel in contact with a face of the element but also moves the drive wheel off the face at one end of the longitudinally extending side to align the drive wheel with the starting ramp on the other face of the element. The switch is deactivated or opened when the drive wheel moves off one face and into alignment with the starting ramp on the opposed face.

In a preferred embodiment of the invention, the starting ramps are compound ramps each having a short initial portion at a greater angle on the face and a longer continuing portion at a lesser angle on the face. The element is arranged to contact resilient stops at each end of its forward and backward travel so that as the drive wheel moves off one face, it will be moved into contact with the initial portion of the starting ramp on the opposed face of the element. When a user pushes the element, the drive wheel will move from the initial portion of the starting ramp to the continuing portion of the ramp, giving the user a feedback feel as the motor is activated to drive the element along its forward or backward path.

In a preferred form of the invention, the resilient member includes a pivotally mounted arm to which the drive wheel is attached, and the drive wheel is driven by the motor through a pulley and belt arrangement. The arm is spring loaded by contact with spring rods on opposed sides of the arm which act to return the arm to a central position from either direction. The spring rods also are moving contacts of the motor switch so that one of the spring rods makes contact with a fixed contact arm on the obverse face side of the element as the drive wheel is moved along the starting ramp on the obverse face side, and the other of the spring rod makes contact with a fixed contact arm on the reverse face side of the element as the drive wheel is moved along the starting ramp on this reverse face side.

BRIEF DESCRIPTION OF THE DRAWING

The present invention will be more fully understood by reference to the following detailed description of the preferred embodiments of the invention when read in conjunction with the accompanying drawing, in which like reference characters refer to like parts throughout the views, and in which:

FIG. 1 is a perspective view showing the reciprocating mechanism of the invention embodied in the element of a sliding door covering a vanity mirror in a vehicular sun visor;

FIG. 2 is a plan view of the flat plate-like door element of FIG. 1 on an enlarged scale showing the drive wheel in alignment with the starting ramp on the obverse face along a longitudinally extending side of the door;

FIG. 3 is an enlarged view of the motor and the resiliently mounted drive wheel rocker arm in the encircled area 3 of FIG. 2;

FIG. 7 is a perspective view of the reciprocating mechanism applied to a drawer such as an automotive glove compartment drawer;

FIG. 8 is a side elevational of the drawer of FIG. 7;

FIG. 9 is a perspective view of the reciprocating mechanism applied to a pivoting door arrangement; and FIG. 10 is a side elevational view of the pivoting door arrangement of FIG. 9.

DETAILED DESCRIPTION OF THE PREFERRED

Embodiments of the Invention

Figure 4:
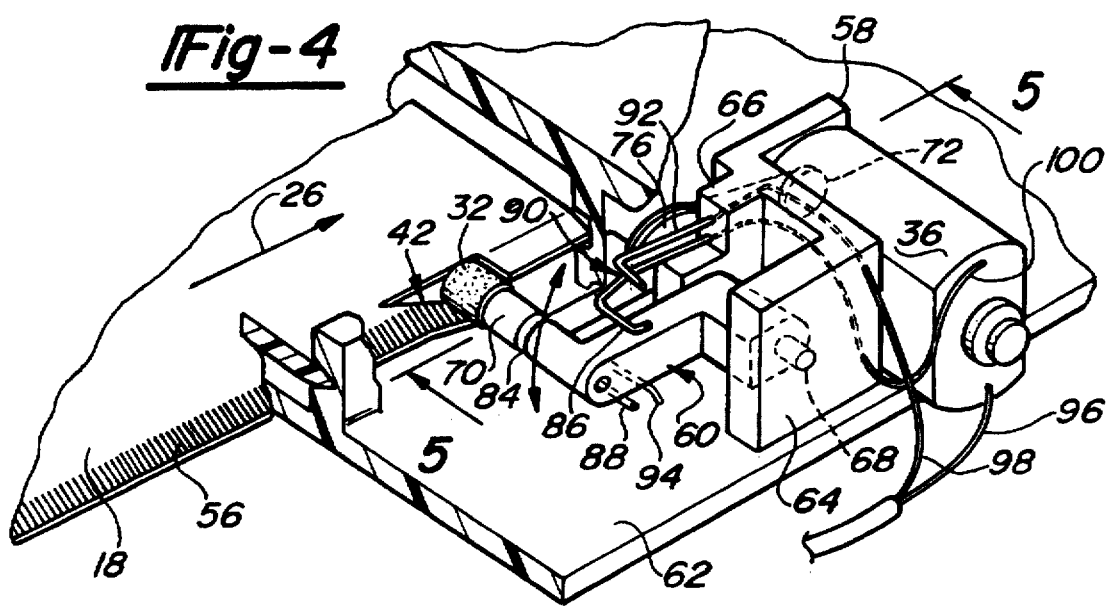
FIG. 4 is a perspective view of the motor and drive wheel rocker arm assembly showing the combined motor switch and the resilient biasing spring rods.

As in our parent application, Ser. No. 08/217,983, filed Mar. 25, 1994, the reciprocating mechanism 10 of this invention is illustrated in a vehicular sun visor 12 wherein the reciprocating element is the sliding door 14 arranged to cover a vanity mirror 16 in its closed position and to expose the mirror for use in its open position.

Examples of vehicular sun visors having vanity mirrors covered by a sliding door are shown in the following U.S. patents in the name of co-inventor, Jay R. White, assigned to the assignee of the present application, Jay Roberts Company: U.S. Pat. Nos. 4,653,798, 4,858,983, 5,054,839, 5,205,689 and 5,438,491. The last of these patents reveals the concept of a motor driving the sliding door.

The obverse, principal or front face 18 of sliding door 14 has a handle 20 which projects through the mirror and door opening 22 of the visor 12. The reverse or rear face 24 of the door 14 overlies the vanity mirror 16.

The door 14 moves in a forward longitudinal direction shown by the arrow 26 from a closed position to an open position, and it moves in a backward or reverse longitudinal direction shown by the arrow 28 from an open position to a closed position. The door 14 is guided in these linear motions by longitudinal guides 30 and is driven by the drive roller 32 through pulley and belt speed reducer 34 from the electric motor 36. The roller 32 is held in resilient contact with the obverse or reverse face 18 or 24 of the door 14 along one of the longitudinally extending sides 56 of the door by resilient member 60 which is a spring loaded rocker arm.

The electric motor 36 is mounted on frame 58 which in turn is mounted on a baseboard 62 of the visor 12. The rocker arm 60 is pivotally mounted between frame legs 64 and 66 on pivot shaft 68. Drive wheel 32 is mounted on the arm 60 by rotating drive shaft 70. Power is transmitted from the motor shaft 72 by O-ring belt 74 to the larger pulley 76 of combined pulley wheel 78 rotatably attached to pivot shaft 68, and from the smaller pulley 80 of pulley wheel 78 by O-ring belt 82 to pulley groove 84 of drive shaft 70, the pulleys and belts constituting a suitable gear reducer 34.

The arm 60 is resiliently biased to a central position between the obverse face 18 and reverse face 24 of the door 14 by obverse face side and reverse face side spring rods 86 and 88 which make contact with opposite sides of the arm 60.

The spring rods 86 and 88 serve the dual function of being the moving contacts of the motor switch 90, spring rod 86 making contact with the fixed contact 92 on the obverse face side of the door and spring rod 88 making contact with the fixed contact 94 on the reverse face side of the door. See FIGS. 4 and 5.

Electrical power is supplied to the motor 36 through unswitched lead wire 96 and switched lead wire 98 through switch 90. Switch lead wire 98 is connected to fixed contacts 92 and 94 to complete the circuit through moving contact 86 or 88 and lead wire 100.

Figure 6:
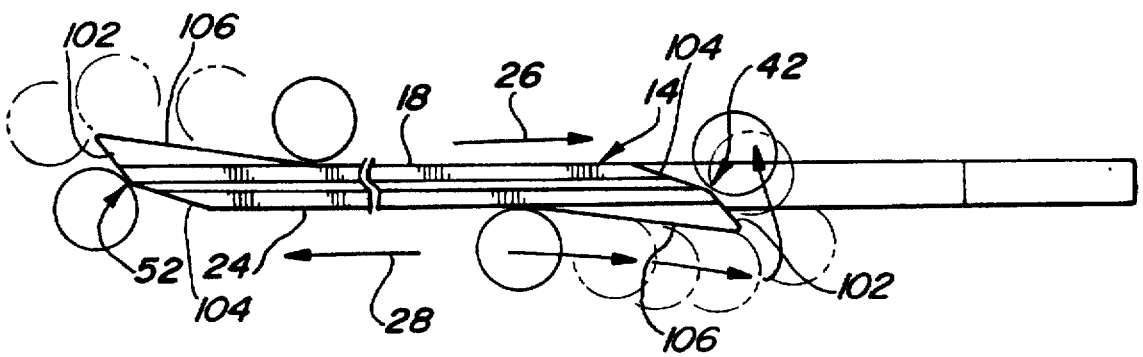
FIG. 6 is a diagrammatic side elevational view of the door element showing its movement relative to the drive wheel.

The obverse face 18 and the reverse face 24 of the door 14 have starting ramps 42 and 52 respectively at opposite ends of the longitudinally extending side 56 of the door, and, in the preferred embodiment illustrated, each of these ramps are compound ramps having a shorter initial portion 102 at a greater angle to the plane of the door 14 and a longer continuing portion 104 at a lesser angle to the plane of the door 14. Also the door has exit ramps 106 extending outwardly from the door on its obverse and reverse faces 18 and 24 at opposite ends of the longitudinally extending side 56 from the starting ramps 42 and 52. See FIG. 6.

The door contacts a resilient stop 108 as it approaches its open position and a resilient stop 110 as it approaches its closed position.

Operation

In operation, when the door 14 is being driven to its closed position, shown in FIG. 2, the spring rod 88 biases the arm 60 to keep the drive wheel 32 in resilient contact with the reverse face 24 of the door until the roller moves along the exit ramp 106 and reaches the end of the longitudinally extending side 56, delineated by the slot 112. The spring rod 88 forces the roller 32 through the slot 112 in line with the starting ramp 42 on the obverse face of the door. The door hits the resilient stop 110 before the roller passes through the slot so that when the roller passes through the slot, the door will rebound moving the roller into contact with the initial portion 102 of the starting ramp 42. The arm 60 pivots causing the roller to pass through the slot and breaking contact between moving contact 88 and fixed contact 94 of the switch 90 on the reverse face side of the door turning the motor 36 off.

When the user pushes on the handle 20 to open the door 14, the roller 32 will move off the initial portion 102 of the starting ramp 42 onto the continuing portion 104, pivoting the arm 60 outwardly from the door and closing the switch 90 by contact of the moving contact 86 with the fixed contact 92 on the obverse face side of the door. The motor 36 being thus energized will move the roller along the obverse face of the door until the door is fully opened and in contact with the resilient stop 108.

In a manner similar to that described above, when the roller moves off the exit ramp 106 on the obverse face 18 side of the door through a slot or at the end 114 of the door as seen in FIG. 2, the spring rod 86 forces the roller 32 pass the end 114 in line with the starting ramp 52 on the reverse face of the door. The door 14 hits the resilient stop 108 before the roller passes off the end 114 of the door so that the door will rebound moving the roller into contact with the initial portion 102 of the starting ramp 52. The arm 60 pivots causing the roller to move pass the end of the door and breaking contact between the moving contact 86 and the fixed contact 92 on the obverse face side of the door turning the motor 36 off. The user can then close the door by pushing against the other side of the handle 20 which again will move the roller off the initial portion 102 of the starting ramp 52 onto the continuing portion 104 closing the switch 90 by contact of the moving spring rod contact 88 into contact with fixed contact 94 on the reverse face 24 side of the door.

Figure 5:
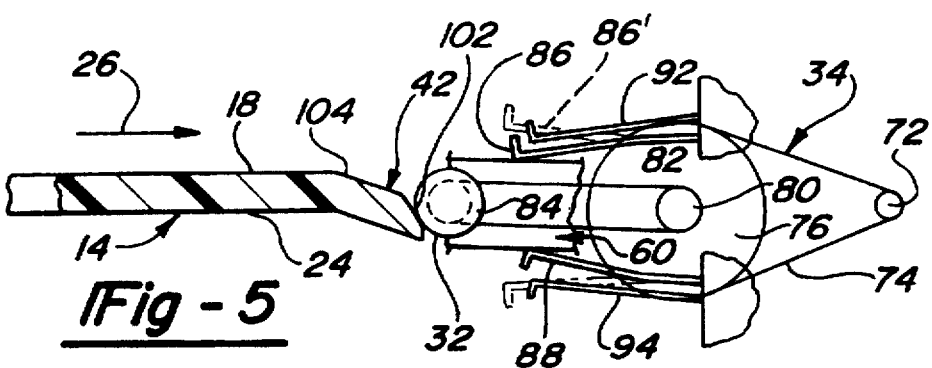
FIG. 5 is a side elevational view showing the drive wheel moved off the reverse face of the door element into alignment and contact with the initial portion of the starting ramp on the obverse face of the door.

It will be apparent that many modifications can be made within the principles of the invention described. The sensitivity or amount of push that needs to be applied to the handle in order to actuate the door can be controlled by the angles of the initial and continuing ramps. This door movement switch may be eliminated in favor of a push button switch if preferred. In a preferred form of the invention, the longitudinally extending side faces of the door can be knurled as shown in FIGS. 2–4 for better frictional contact with the roller 32.

In the embodiment of FIGS. 7 and 8, the element being reciprocated by the mechanism 10 is a drawer 124 such as an automotive glove compartment drawer having a front face 116 and a slide guide 118 associated with the drawer sides 120 and 122. The obverse face 42 of the element is seen to be at the top inside longitudinally extending edge 56 of the side 122 with the reverse face, not seen, being on the outside surface of the side 122. The obverse and reverse faces could be located on a horizontally disposed flange extending out from one of the sides 120 and 122 if the installation better accommodates such an arrangement. It will also be apparent that the drawer 114 could be vertically oriented with the obverse and reverse faces located in a vertical plane. The open position of the drawer is shown in phantom at 124' in FIG. 8 with a full line position 124 indicating the closed position.

In the embodiment of FIGS. 9 and 10, the element being reciprocated by the mechanism 10 is a pivoting door 126.

The obverse and reverse faces 42 and 52 are on opposite sides of a longitudinally extending arcuate flange 128 on one side member 130 of the door. The door 126 is pivoted about stub shafts 132 extending outwardly from side members 130, and the two extreme positions of the door are seen at 126 in full line and at 126' in phantom in FIG. 10. The extent to which the door is pivoted can be varied by the length and shape of the arcuate flange 128, a garage door typically requiring a 90° arc.

We claim:

1. A reciprocating mechanism comprising:
   a motor;
   a drive wheel connected to and rotated by said motor;
   an element having an obverse face and a reverse face along a longitudinally extending side;
   a resilient member biasingly maintaining said drive wheel in resilient contact with said obverse face for moving said element in a forward direction and for maintaining said drive wheel in resilient contact with said reverse face for moving said element in a backward direction;
   a starting ramp on said obverse face and a starting ramp on said reverse face at opposite ends of said longitudinally extending side; and
   a switch arranged to activate said motor when said element is moved with said drive wheel in contact with one of said starting ramps.

2. The mechanism according to claim 1 wherein said resilient member is arranged to move said drive wheel off said obverse face at one end of said longitudinally extending side to align said drive wheel with the starting ramp on the reverse face of said element, and to move said drive wheel off said reverse face at the other end of said longitudinally extending side to align said drive wheel with said starting ramp on the obverse face of said element.

3. The mechanism according to claim 2 wherein said switch is opened, deactivating said motor, when said drive wheel moves off said obverse face and into alignment with said starting ramp on the reverse face of said element and when said drive wheel moves off said reverse face and into alignment with said starting ramp on the obverse face of said element.

4. The mechanism according to claim 3 wherein said element is a flat plate having starting ramps on its obverse and reverse faces.

5. The mechanism according to claim 4 wherein said flat plate is a sliding door with said reverse face overlying a vanity mirror mounted in a vehicular sun visor so that when said drive wheel is in contact with said obverse face, said door is moved in a forward direction from a closed position covering said vanity mirror to an open position exposing said vanity mirror for use, and when said drive wheel is in contact with said reverse face, said door is moved in a backward direction from said open to said closed position.

6. The mechanism according to claim 5 wherein said door has exit ramps extending outwardly from said door on its obverse and reverse face at opposite ends of said longitudinally extending side from said starting ramps.

7. The mechanism according to claim 3 wherein said element is a sliding drawer and said obverse and reverse faces are located on a longitudinally extending flange of said drawer.

8. The mechanism according to claim 3 wherein said element is a pivoting door, and said obverse and reverse faces are located on a longitudinally extending arcuate flange on said door.

9. The mechanism according to claim 3 wherein said element is arranged to contact a first resilient stop when said drive wheel moves off said obverse surface moving said drive wheel into contact with the starting ramp on the reverse face of said element, and said element is arranged to contact a second resilient stop when said drive wheel moves off said reverse face moving said drive wheel into contact with the starting ramp on the obverse face of said element.

10. The mechanism according to claim 9 wherein said starting ramps are compound ramps each having an initial portion at a greater angle on the face and a continuing portion at a lesser angle on the face, and wherein contact of said element with said first resilient stop will move said element so that said drive wheel will be in contact with the initial portion of the starting ramp on the reverse face of said element, and wherein contact of said element with said second resilient stop will move said element so that said drive wheel will be in contact with the initial portion of the starting ramp on the obverse face of said element.

11. The mechanism according to claim 10 wherein when a user pushes said element moving the starting ramp on one of the reverse face and obverse face against the drive wheel, the drive wheel will move from the initial portion to the continuing portion of the ramp giving the user a feedback feel and activating said motor.

12. The mechanism according to claim 1 wherein said resilient member includes a pivotally mounted arm with said drive wheel attached to it, and said switch is activated as said arm is pivoted in either direction from a central position.

13. The mechanism according to claim 12 wherein said pivotally mounted arm is spring-loaded to return said arm to said central position from either direction.

14. The mechanism according to claim 13 wherein said pivotally mounted arm is spring-loaded by contact with spring rods on opposed sides of said arm.

15. The mechanism according to claim 14 wherein said spring rods are moving contacts of said switch, one of said spring rods making contact with a fixed contact arm on the obverse face side of said element as said drive wheel is moved along the starting ramp on said obverse face side, and the other of said spring rods making contact with a fixed contact arm on the reverse face side of said element as said drive wheel is moved along the starting ramp on said reverse face side.

16. A reciprocating mechanism comprising:
   a motor;
   a drive wheel connected to and rotated by said motor;
   an element having an obverse face and a reverse face along a longitudinally extending side;
   a resilient member biasingly maintaining said drive wheel in resilient contact with said obverse face for moving said element in a forward direction and for maintaining said drive wheel in resilient contact with said reverse face for moving said element in a backward direction;
   said resilient member including a pivotally mounted arm with said drive wheel attached to it and a pair of spring rods in contact with opposite sides of said arm biasing said arm toward a central position between said obverse and reverse faces.

17. The mechanism of claim 16 including a starting ramp on said obverse face and a starting ramp on said reverse face at opposite ends of said longitudinally extending side, and wherein said spring rods are moving contacts of a switch for said motor, one of said spring rods making contact with a fixed contact arm on the obverse face side of said element as said drive wheel is moved along the starting ramp on said obverse face side and the other of said spring rods making contact with a fixed contact arm on the reverse face side of said element as said drive wheel is moved along the starting ramp on said reverse face side.

18. The mechanism of claim 16 wherein said drive wheel is connected to said motor by pulleys and a drive belt.

* * * * *